July 30, 1968        K. J. STETTEN        3,395,246

DUAL TUBE STANDARDS CONVERSION SYSTEM

Filed July 22, 1965

INVENTOR
KENNETH J. STETTEN

BY Thomas I. Davenport

ATTORNEY

United States Patent Office 3,395,246
Patented July 30, 1968

---

3,395,246
DUAL TUBE STANDARDS CONVERSION SYSTEM
Kenneth J. Stetten, McLean, Va., assignor, by mesne assignments, to Westinghouse Electric Corporation, Pittsburgh, Pa., a corporation of Pennsylvania
Filed July 22, 1965, Ser. No. 474,057
11 Claims. (Cl. 178—6.8)

This invention relates to a display system employing a scan converter and more particularly to an improved method and apparatus for scan conversion.

Scan conversion involves converting electric signals from one form to another where the latter form generally involves a TV type scanning pattern susceptible of producing a visual display as on a cathode ray tube. Scan converters are useful in radar systems for converting polar coordinate information such as radar, PPI signals into standard TV signals, etc. Scan converters also exhibit utility in air traffic control systems and inventory control systems, by way of further example.

The present invention involves the use of light-sensitive films of the photochromic type and of the Kalvar type in a scan conversion system. This is in distinction to many prior types of scan converters which have utilized various electrical devices and systems for the storage of information. By the use of phototropic films (direct read-out types of film), the information may be either temporarily or permanently stored on the film. Photochromic film, sometimes known as phototropic film, is initially transparent and has the property of forming a temporary image upon exposure to or excitation from ultra-violet light. The image formed thereon is dark and persists for a variable length of time, known as the persistence time, and then fades away. Such films are described, by way of example, in the U.S. Patents 2,953,454 and 3,134,674, as well as numerous monographs in the literature of this art, all as well known to workers in this field. Kalvar type film may be regarded as one type of the more general phototropic films and is marketed by the Kalvar Corporation and described in several U.S. patents, among them 2,911,299 and 2,976,145. Kalvar film has the property of forming a latent image upon excitation from or exposure to ultraviolet light. This image is developed (made permanent) by the application of heat to those portions of the film which carry the latent image. In Kalvar film, the latent image consists of bubble nucleation centers which expand to form bubbles upon the application of heat. These bubbles are of a different index of refraction than that of the film. The collection of such bubbles scatters incident light and thus gives rise to a semi-opaque area effectively of a different optical transmissivity than the remainder of the film.

Figure 1:
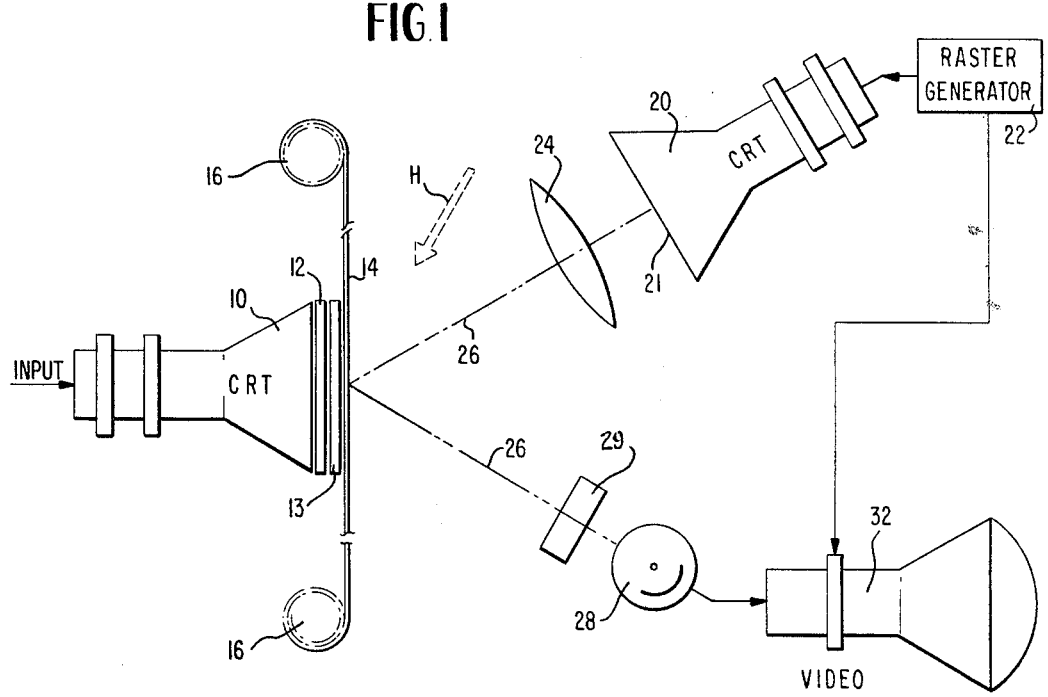
Figure 2:
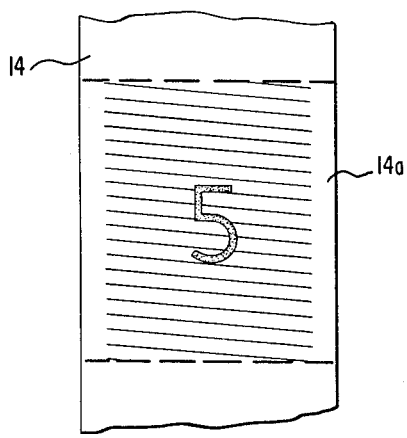

In the drawings:
FIGURE 1 is a partially schematic view of the dual tube scan conversion system of this invention.
FIGURE 2 is a fragmentary view of the film strip adjacent the face plate of the cathode ray tube of FIGURE 1.

Referring now to FIGURE 1 of the drawings, the numeral 10 denotes a cathode ray tube (CRT) of generally conventional construction and provided on the interior portion of its face plate with a phosphor layer which emits ultra-violet light upon the incidence of the electron beam of the CRT thereon. In order to more precisely collate the ultra-violet light emitted from the phosphor layer, a fiber optic plate 12 may be placed on the exterior surface of the face plate of the CRT. Such a fiber optic plate is composed of a plurality of small diameter light tubes each of which has a longitudinal axis substantially parallel to the longitudinal axis of the illustrated tube 10. Such fiber optic face plates and their method of manufacture are well known to workers in this art and hence a description thereof will not be here set forth. A dichroic plate 13 is positioned between the fiber optic plate 12 and film 14. Dichroic plate 13 transmits ultra-violet light while reflecting light of other wavelengths. The numeral 14 denotes a light-sensitive film of the photochromic type or of the Kalvar type, above described. For many applications, particularly with the use of Kalvar film, the film 14 is in the form of an elongated band supported at its ends by rotating spools or reels 16. With photochromic film, the spools 16 are not absolutely necessary. The film strip 14 runs across the exterior surface of dichroic plate 13 in contiguous or touching relationship.

The numeral 20 denotes a second cathode ray tube (CRT) of conventional construction, the interior surface of its face plate being provided with a phosphor layer which emits light of a wavelength other than that primarily required to expose the photosensitive film, such as visible light wavelength. The numeral 22 denotes a raster generator of conventional construction coupled to CRT 20 to thereby form a flying spot generator and is also coupled to a video output tube 32. With the raster generator in operation, a flying spot of light traversing a repetitive, generally zig-zag pattern appears on the face plate of CRT 20. For convenience in the explanation which is to follow, the numeral 21 will denote the face plate of CRT 20.

A focusing lens 24 is located in front of face plate 21 and collates the light (flying spot) emitted therefrom for incidence upon a photo multiplier tube 28 along optical path 26, the path being from face plate 21 to the film strip 14 and thence to the photo multiplier tube. In this manner, the scanning pattern of CRT 20 on its face plate 21 is collected on the photo multiplier tube with the film strip 14 immediately adjacent the CRT 10 interposed in the optical path 26, to provide a modification or modulation of the flying spot scanning pattern by whatever is on the film strip 14 adjacent the CRT 10. As will be apparent, the light from face plate 21 is reflected from the dichroic plate 13. The output of the photo multiplier tube 28 is connected, in a conventional manner, to the video output tube 32, the screen of which is adapted to receive the final desired image, as below explained.

The operation of the dual tube scan conversion system above described is as follows. Assume now that photochromic film is employed as the film 14. The CRT 10 is supplied with indicia related input signals corresponding to the desired information to be displayed on video tube 32. In accordance with the desired display pattern, the electron beam from the electron gun within CRT 10 is suitablly deflected to trace out the desired pattern on the face plate of CRT 10. Selected portions of the phosphor coating are excited, thus emitting ultra-violet light at these portions, which passes through the fiber optic face plate 12 and dichroic plate 13 to thereby excite the photochromic film 14. Upon excitation of localized areas, the film 14 temporarily darkens. The scanning pattern from the face plate 21 of CRT 20, produced by raster generator 22, scans the film 14 with the scanning pattern being received by photo multiplier 28. The intensity of the pattern received by the photo multiplier tube would roughly be the same as that transmitted by CRT 20, were there no darkened portions on film 14, it being recalled that the darkened portions corresponding to the desired information to be displayed. Thus, the received raster pattern is attenuated by those portions of film 14 which are darkened. This is illustrated in FIGURE 2 of the drawings wherein the scanning pattern is denoted by the plurality of parallel and sloping lines. It is believed apparent that the flying spot of visible light traversing the area 14a of the film 14 will be reflected except from those portions corresponding to the desired display configuration, here illustrated in the form of the numeral 5. What is seen in FIGURE 2 thus corresponds to the signal which is transmitted to the photo multiplier tube, the signal representing an unmodulated or continuous light intensity on the non-excited portions of film strip 14 interspersed with signals of less intensity corresponding to the darkened portions of the film 14. The photo multiplier tube output then reproduces the modulated raster pattern on video tube 32 to produce a reconstruction of the indicia on portion 14a. It will be observed that the dichloric filter 13, in conjunction with the film 14, admits of simultaneous writing and reading of information.

From the description of Kalvar film set forth earlier, the reader will appreciate that the system illustrated at FIGURE 1 will also admit of the use of Kalvar film as the film strip 14. In this case, a film transport mechanism, such as illustrated in FIGURE 2, must be employed since the developed image on Kalvar film is permanent. A schematically indicated source of heat H, such as a small hot air blower or an infra-red lamp, is located so that the heat energy impinges upon the Kalvar film in the area 14a of film strip 14. Thus, the film is at all times heated to its development or fixation temperature thereby admitting of very nearly instantaneous expansion of gas bubbles within the film from the bubble nucleation centers which are formed within the film upon its excitation by ultra-violet light. With this explanation, it is believed that the reader can readily grasp that the mode of operation of the dual tube scan conversion system employing Kalvar film is the same as that above described with reference to Kalvar type film. Another dichroic filter 29 may be positioned in front of the optical input to the photo multiplier tube to preclude the entry therein of light other than the wave length emitted by the phosphor on face plate 21.

The source of heat H may also be employed when using photochromic film. By increasing the temperature of photochromic film, the image persistence time is diminished. Thus, a variable temperature control for the source H permits the variance of the persistence time. Such persistence variance is useful, for example, in radar systems where the persistence time is made equal to the period of sweep of the antenna. With Kalvar film, varying the temperature of H will vary the rapidity of formation of the image thereon.

The above dual tube scan conversion system employs a direct print out type of film, whether photochromic or Kalvar type irradiated with ultra-violet light, to thereby admit of great rapidity of operation. Further, in the use of Kalvar type film, a permanent record of the displayed indicia is afforded.

What is claimed is:

1. A scan converter display system including: means for producing a raster pattern on a photo-sensitive tube along an optical path, a light-sensitive film in said optical path, an indicia related source of radiation for exciting said film, a dichroic mirror behind said film, said mirror transmitting indicia related radiation from said source and reflecting the wave lengths of light which comprise said raster image to said photo-sensitive tube.

2. The system of claim 1 wherein said film is a photochromic film.

3. The system of claim 2 including means for varying the persistence time of images on said film.

4. The system of claim 1 wherein said film forms latent images upon excitation by said radiation, and means for developing said film.

5. The system of claim 3 including means for varying the time lag between the formation of latent images and their development.

6. A scan converter display system including: a lens directing a raster pattern on a photo multiplier tube whose output is coupled to a display device, direct print-out, a light-sensitive film in an image plane at the lens, an indicia related source of radiation for exciting said film, and a dichroic mirror behind said film, said mirror transmitting indicia related radiation from said source and reflecting the wave lengths which comprise said raster image.

7. The system of claim 6 wherein said film is photochromic film.

8. The system of claim 6 wherein said film forms latent images upon excitation by said radiation, and means for developing said film.

9. The system of claim 7 including means for varying the persistence time of images on said film.

10. The system of claim 8 including means for varying the time lag between the formation of latent images and their development.

11. A scan conversion system including: means for producing a raster pattern of a first wave length on a surface, means for optically directing said surface on a light-sensitive element, said element coupled to a display device, an optical path between said surface and said element, means positioned in said optical path for modulating the raster produced by said means for producing a raster, said modulating means including a film, an indicia related source of radiation for exciting said film, said radiation being of a second wave length, said first and second wave lengths being different, a dichroic mirror behind said film, said mirror reflecting said first wave length and transmitting said second wave length.

References Cited
UNITED STATES PATENTS 3,331,920    7/1967    Larson _____ 178—5.4
3,345,459    10/1967    Dudley _____ 178—7.5

ROBERT L. GRIFFIN, *Primary Examiner.*

R. L. RICHARDSON, *Assistant Examiner.*